Feb. 25, 1969     L. KLEIN     3,429,347
EXTENSION SUPPORT FOR SLIDING TABLE SAWS
Filed June 20, 1966
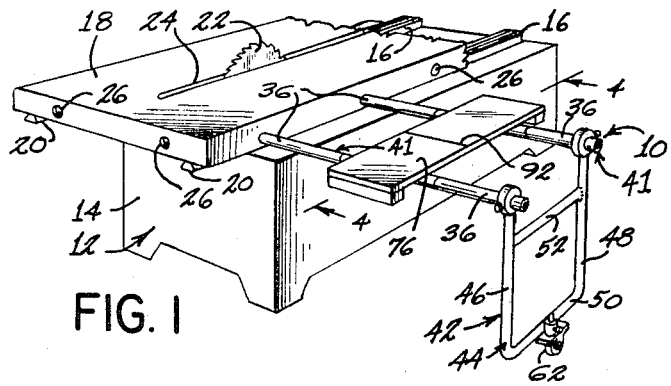
FIG. 1
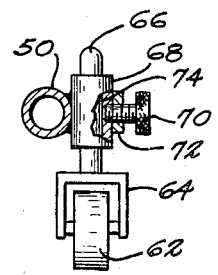
FIG. 3
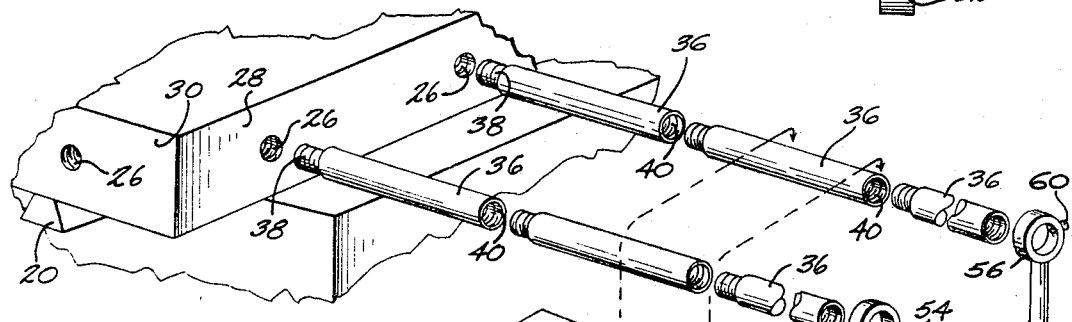
FIG. 2
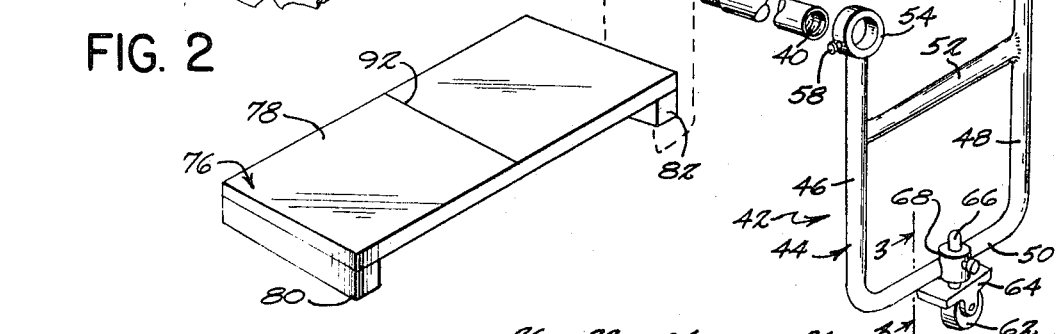
FIG. 4     FIG. 5
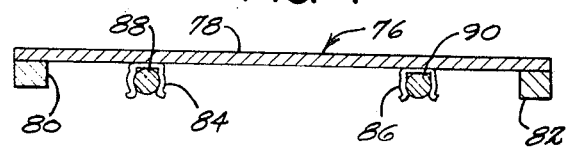
INVENTOR.
LOUIS KLEIN
BY Meyers & Peterson
ATTORNEYS cd# United States Patent Office 3,429,347
Patented Feb. 25, 1969

3,429,347
EXTENSION SUPPORT FOR SLIDING TABLE SAWS
Louis Klein, Apt. 1202, 569 Sheppard Ave. W., Downsview, Ontario, Canada
Filed June 20, 1966, Ser. No. 558,983
U.S. Cl. 143—52        6 Claims
Int. Cl. B27b 5/22

ABSTRACT OF THE DISCLOSURE

An extension for a movable worktable on a saw comprised of elongated extension arms coupleable to end or side edges of the table and provided with a ground-engaging frame supporting the free ends of the arms; the frame including a ground-contacting roller permitting free movement of said arms and support frame with the worktable.

---

This invention relates to power saws having a moving work-supporting surface or table. More particularly, the invention relates to an extension means for increasing the work handling capacity of such a tool.

It is an object of this invention to provide a device for enlarging or expanding the work-supporting capacity of a sliding table saw, the device possessing a high degree of adaptability. More particularly, it is an aim of this invention to provide a table extension means having provision for selectively varying the size of the extension as well as the location thereof with respect to the main table of the tool.

It is another object of this invention to provide a table extension means for a tool having a movable work-supporting table which is relatively simple in construction and low in cost, but which possesses a high degree of structural rigidity and strength.

It is yet anoter object of the invention to provide a table extension means having an auxiliary work-supporting table thereon which can be easily attached to and removed from a variety of positions on the extension means and which can be easily moved to vary its location after attachment. Thus, by providing for ready positioning of the auxiliary work-supporting table, it can be made quite small and light, so that its own weight will not add appreciably to the extension supporting elements of the device.

Still another object of the invention is to provide a variable size extension means for a sliding table circular saw or the like, the extension means having provision for supporting its outer free end from the floor on which the tool is resting and in which this supporting means permits the auxiliary table to move with the main table of the tool.

Briefly described, the extension means of the present invention is adapted to be attached selectively to two of a plurality of threaded openings which are spaced around the edge surfaces of the main table of the tool, both on its side surfaces and on its end surfaces, so that the attachment position of the extension may be varied at will. The extension means itself includes a plurality of extension rods having threaded ends for engaging the openings in the sides and ends of the table and threaded openings equivalent to the table openings at their opposite ends, so that the extension rods may be connected in end-to-end relation to vary the length of the extension. Other elements of the extension means are: an auxiliary work-supporting table which may be clipped onto the extension support rods by means of a pair of spaced elongated spring clips, this assembly also acting as a bracing means to increase the rigidity of the extension; and a supporting frame which extends between the floor and the free outer end of the extension rods, this frame carrying a wheel for supporting the extension assembly for rolling movement along the floor as the main table is moved.

Other objects, advantages and new features of the present invention will become apparent from a reading of the following detailed description when considered in conjunction with the accompanying drawings wherein:

FIGURE 1 is a perspective view of a sliding table circular saw utilizing the present invention, a portion of the table being broken away to show the guides therefor;

FIGURE 2 is an enlarged exploded view of the extension means as shown in FIGURE 1;

FIGURE 3 is a detailed sectional view taken on the line 3—3 of FIGURE 2;

FIGURE 4 is a sectional view taken on the line 4—4 of FIGURE 1; and

FIGURE 5 is a a plan view of a saw table of the type shown in FIGURE 1, with the extension means being applied to an end face, rather than a side face thereof.

In the illustrated embodiment of the invention, a table extension means generally indicated at 10 is shown as applied to a sliding table type of power saw 12. Saw 12 consists essentially of a base 14 having guide ways 16 for supporting a sliding, working-supporting table 18, the table 18 having guides 20 on its lower side for cooperation with the guide ways 16. A circular saw blade 22 normally extends up through an elongated slot 24 in table 18, and is rotated by motor means and a suitable drive connection, not shown.

The various parts of the extension means 10 and the manner in which they are assembled will be best understood with reference to FIGURE 2. As there shown, the table 18 is provided with a plurality of tapped openings 26 on both its side peripheral edge 28 and its forward edge 30. Similar openings are found on the other edges 32 and 34 of table 18, as shown in dotted outline in FIGURE 5. The openings 26 are spaced apart by a predetermined distance for a purpose which will become apparent as the description proceeds.

Threadedly engaged with the oppenings 26 are the first of a series of extension rods 36, each of which has an externally threaded male element 38 at one end thereof and an internally threaded bore 40 at the other end. Bores 40 correspond in size with openings 26, so that the extension rods are fully interchangeable and may be threadedly connected in end-to-end relation to the desired length. The rods 36 are engaged with a selected pair of the openings 26 in the main table 18 to form a pair of spaced, parallel extension supports which have been given the reference designation 41, in order to distinguish them from the rods themselves.

A support 42 is employed to hold the outer ends of the extension supports 41 when several of the extension rods 36 have been employed. The length of the extension rods 36 is such that when only two of the rods are used for the extension, outer support for the free ends is generally not required; however, when more rods 36 are used to form the extension supports 41, some means of preventing drooping of the outer ends is required. The support 42 consists of a frame 44, preferably made of tubular stock bent into a U-shape to define vertically extending legs 46 and 48, and a horizontal bight portion 50. A cross brace 52 may also be provided, if desired.

For connecting the frame 44 to the extension rods 36, a pair of ring elements 54 and 56 are provided on the upper ends of the legs 46 and 48 respectively. Rings 54 and 56 are adapted to encircle the extension rods 36 in relatively close-fitting sliding fashion, so that the position of the frame 44 may be adjusted with respect to the axial direction of the extension supports 41. Set screws 58 and 60 pass through suitable tapped openings in the rings 54 and 56, respectively, and are tightened to secure the frame 44 in place.

A roller 62 is mounted on the bight portion 50 of the frame 44, so that the extension may roll along the floor as the table 18 is moved. As shown, the roller 62 is journaled in a suitable yoke 64 which is adjustably mounted on bight portion 50 to permit both vertical adjustment of the roller and adjustment of the axis of the roller through 90° for a purpose to be explained below. With reference to FIGURE 3, it will be observed that yoke 64 carries a vertical pin 66 which is journaled in a sleeve 68, welded or otherwise secured to bight portion 50. A set screw 70 extends through the wall of sleeve 68 into engagement with the pin 66 to secure it in place. The necessary threaded opening for set screw 70 may be provided either directly in the sleeve 68 or, if this element is too thin, a convenient method of supplying the threaded opening is to weld a nut, such as nut 72, to the surface of sleeve 68 in alignment with the larger opening 74.

An auxiliary work-supporting table 76 is provided which may be clipped onto the extension supports 41. The table 76 is made up of a flat top plate 78 of such thickness that when it is applied to the extension supports 41, the top surface thereof will be co-planar with the top surface of the table 18. The ends of the plate 78 are provided with ribs 80 and 82, as shown, these ribs providing a thickness of the ends of the extension table 76 substantially equal to the thickness of the four ends of the main table 18. This is done so that auxiliary or accessory elements, such as work holddown clamps or the like which are provided for use on the table 18, may also be used on the auxiliary table 76.

The auxiliary table 76 is adapted to be spring-clipped onto the extension supports 41. With reference to FIGURE 4, it will be apparent that the lower side of the plate 78 carries spring clips 84 and 86, which are separated by the same distance as the spacing of the openings 26 and the extension supports 41. The spring clips 84 and 86 are rounded in cross section so as to embrace the rods 36. Each spring also has a flat bight portion 88 and 90, respectively, which is secured to the lower surface of table 78, as by means of an epoxy adhesive, for example. The spring clips 84 and 86 are relatively long so that they engage the extension supports 41 over a substantial axial distance, as suggested in the dotted line showing in FIGURE 5. The result of this elongation is to provide reinforcing support for the extension supports 41, in the sense of preventing lateral flexing thereof.

It will be noted that the auxiliary table 76 carries a line 92 scribed thereon. The direction of the line 92 is parallel to the extension supports 41 when the table 76 is mounted thereon, and its function is to indicate the exit point of the saw blade when the extension means is used on the front edge of the table, as illustrated in FIGURE 5. When used in this fashion, the extension provides a convenient support for use when aligning for cutting a relatively long workpiece. It will be understood, of course, that the roller 62 will be rotated so that its axis will be properly oriented to permit the rolling action of the extension means as the table is moved.

When the extension means 10 is positioned at the front edge of the table, as shown in FIGURE 5, the scribed line 92 is so positioned on the auxiliary table 76 that it lies parallel to the blade 22 and at one edge of the line of cut of the blade. If this edge were to be extended to reach to the scribed line, the effect would be for the scribed line to represent one edge of the saw blade kerf. It will be understood from the construction of the spring clip 84 and 86 that only a small measure of resistance is presented to axial sliding movement of the auxiliary table 76 on the supports 41. This arrangement provides a convenient method of using the table 76 when making cuts in long work where the cut is longer than the capacity of the slot 24 in the table 18, that is, where a greater travel of the work is required to complete the cut than is available in the sliding movement of the table 18 itself. Thus, for making such a cut, the work is applied to the surface of the table 18 and to the auxiliary table 76. The table 76 is then positioned at the proper location so as to expose scribed line 92 at the edge of the work. The desired point of exit of the blade is aligned to this scribed line. The forward edge of the work is positioned with the desired point of entry of the blade oriented in the proper relationship to the blade 22, regardless of the angle that the work may bear to the blade. The work is clamped into place by suitable holddown clamps, such as those described in my U.S. Patent No. 3,298,157, issued Jan. 17, 1967, applied to the edges of table 18 to hold the forward edge of the work in position with respect to the saw blade and also to the edges of auxiliary table 76 to hold the rear edge of the work in position with respect to the scribed line 92, thereby making the work, the table 18, and the auxiliary table 76 all aligned and joined as into one inflexible unit.

The entire assembly is then moved forward towards the saw blade 22 to effect as much of the cut as possible, being fully withdrawn after cutting. After this is accomplished, only the forward hold-down clamp, that is the one holding the work down with respect to table 18, is loosened. The work, together with the table 76, is then slid toward the blade 22 to be repositioned for continuing the cutting. Thereafter, the holddown clamp is again applied to the work on table 18 and the next part of the cut is made. This procedure is then repeated until the cut is completed. For the last forward movement, the work is released from auxiliary table 76 and is advanced onto table 18 so that it can be cut, but still being kept in alignment with saw blade 22. The effect of this procedure is to cut a long piece of work in steps, or stages, each step taken being the length of the movement of the table. It will be understood that the lateral bracing, provided by the elongated character of the spring clips 84 and 86, contributes to the accuracy of any cut which is made by this method, since the accuracy of the position of the scribed line 92 is controlled thereby.

It should now be apparent that an extension means for the work-supporting surface of a sliding table saw has been described which fulfills each and all of the objects set forth above. The extension means is relatively simple in construction, but possess a high degree of structural rigidity and strength so that various cutting operations may be performed. The structure is particularly useful, as described above, when applied to the forward surface of the saw, so that extremely long cuts can be made, requiring a knowledge only of the entrance point and the exit point of the saw blade on the work. The length of the extension can be quickly varied by adding or subtracting extension rods 36, and the auxiliary table 76 is readily positionable on the supports provided by the extension rods 36, so that it need not be large in order for the extension to accomplish its intended function.

There are obvious modifications of the assembly which will occur to those skilled in the art who have the benefit of the above disclosure. Accordingly, it is to be understood that within the scope of the appended claims, the invention may be practiced otherwise than as herein specifically described.

I claim:

1. In combination with a table saw having a saw blade and a work supporting table movably mounted with respect to said saw blade, extension means for increasing the work handling capacity of said table comprising a plurality of extension rods detachably secured to the peripheral edge of the table to each other in end-to-end relation to provide a spaced parallel pair of extension supports, and a frame engaged with said extension supports for supporting the free outer ends thereof, said frame extending between said supports and a floor on which said said table rests, said frame being U-shaped having a pair of vertical legs and a bight portion joining the lower ends thereof, said legs being slidably mounted at their upper ends upon said extension supports and including securing means for releasably securing said legs in position upon said supports, and a roller mounted on said bight portion providing free rolling contact of said frame relative to said floor procuring free movement of said frame with said table upon movement thereof relative to said saw blade.

2. A table extension means as recited in claim 1 further comprising an auxiliary table carried by said extension supports, said work-supporting table having a predetermined thickness adapted to have accessories clamped thereon, said auxiliary table comprising a flat plate of such thickness that a surface in co-planar relation to the surface of said work-supporting table is presented when said auxiliary table is in place on said extension supports, said auxiliary table having a rib at at least one edge thereof for increasing the effective thickness of said edge for receiving accessories clamped thereon.

3. A table extension means as recited in claim 1 wherein said work-supporting table has a pair of side surfaces and a pair of end surfaces, at least two threaded openings being provided in predetermined spaced relation in said side surfaces and in said end surfaces, each of said extension rods having a threaded male end secured within said threaded openings selectively and an internally threaded female end receiving the male end of another extension rod.

4. A table extension means as defined in claim 2 wherein said auxiliary table surface carries an index line parallel to and in predetermined relation to said saw blade when said auxiliary table is installed as aforesaid.

5. A table extension means as defined in claim 1 including a pair of rings carried at the upper ends of said vertical legs adapted to encircle said extension supports in sliding relation thereto, and a set screw passing through each of said rings for securing said rings in place on said supports.

6. A table extension means as recited in claim 1, said roller being adjustably mounted on said bight portion of said frame for vertical adjustment with respect to said frame and for adjustment of the axis of said roller with respect to the direction of motion of said table.

References Cited

UNITED STATES PATENTS

| | | | |
|---|---|---|---|
| 729,374 | 5/1903 | Marsh | 143—52 |
| 1,068,593 | 7/1913 | Koch | 297—149 |
| 2,633,221 | 3/1953 | Roeoer | 143—132 X |
| 2,913,022 | 11/1959 | Siemantel | 143—132 |
| 3,349,819 | 10/1967 | Koons | 143—132 X |

FRANCIS S. HUSAR, *Primary Examiner.*

U.S. Cl. X.R.

143—25